United States Patent [19]

Bartz

[11] Patent Number: 4,881,650
[45] Date of Patent: Nov. 21, 1989

[54] FLUID COLLECTION CONTAINER

[76] Inventor: Richard O. Bartz, 7017 Mark Terrace Dr., Edina, Minn. 55435

[21] Appl. No.: 206,313

[22] Filed: Jun. 14, 1988

[51] Int. Cl.$^4$ ............................................. B65D 85/00
[52] U.S. Cl. .................................. 220/1 C; 215/1 C; 141/98
[58] Field of Search ......................... 220/1 C, DIG. 6; 206/223; 141/98, 331, 339; 184/1.5; 215/1 C

[56] References Cited

U.S. PATENT DOCUMENTS

| | | |
|---|---|---|
| Re. 27,449 | 8/1972 | Bartz . |
| Des. 220,470 | 4/1971 | Lewis . |
| Des. 248,845 | 8/1978 | White et al. . |
| Des. 264,180 | 5/1982 | Bartz . |
| 948,994 | 2/1910 | Howland . |
| 1,506,028 | 8/1924 | Perritt . |
| 1,554,589 | 9/1925 | Long . |
| 1,568,830 | 1/1926 | Gunderson . |
| 3,169,605 | 2/1965 | Ashmead . |
| 3,746,200 | 7/1973 | Flider .................. 215/1 C X |
| 4,010,863 | 3/1977 | Ebel . |
| 4,054,184 | 9/1977 | Marcinko . |
| 4,099,598 | 7/1978 | Clinard . |
| 4,114,644 | 9/1978 | Piper . |
| 4,195,710 | 4/1980 | Garrison . |
| 4,296,838 | 10/1981 | Cohen ................... 220/1 C X |
| 4,301,841 | 11/1981 | Sandow .................... 141/98 |
| 4,308,955 | 1/1982 | Schieser et al. ........... 220/72 X |
| 4,392,552 | 7/1983 | Partridge . |
| 4,488,584 | 12/1984 | Hestehave et al. . |
| 4,513,865 | 4/1985 | Melzi et al. . |
| 4,524,866 | 6/1985 | Pollaco . |
| 4,533,042 | 8/1985 | Pallacco ..................... 206/223 |
| 4,632,268 | 12/1986 | Melzi et al. . |
| 4,640,431 | 2/1987 | Harrison . |
| 4,673,081 | 6/1987 | Habig et al. ............ 220/1 C X |
| 4,750,629 | 6/1988 | Young ..................... 215/1 C |

FOREIGN PATENT DOCUMENTS

| | | |
|---|---|---|
| 39736 | 10/1975 | Canada . |
| 957107 | 2/1957 | Fed. Rep. of Germany . |
| MR 2737 | 12/1973 | Fed. Rep. of Germany . |
| 967304 | 10/1974 | United Kingdom . |
| 1416096 | 12/1975 | United Kingdom . |

OTHER PUBLICATIONS

The Aries Industries, Inc. Publication—"Oil Drain Pit".
Motortrend, Dec. '76, pp. 73, 74, and 115—"Basic Tools".
Mechanix Illustrated, Nov. '76, pp. 142—"Oil Catcher".

*Primary Examiner*—Steven M. Pollard
*Attorney, Agent, or Firm*—Burd, Bartz & Gutenkauf

[57] ABSTRACT

A container for collecting and storing oil drained from an internal combustion engine has a bottom wall and a lower end wall for selectively supporting the container in prone and upright positions. The top wall has a funnel-shaped portion surrounded by an upwardly directed, continuous ridge. The lower most portion of the top wall has a hole open to the chamber to allow oil to drain into the chamber. The upper end wall has a first handle used to carry the container. A second handle is located diagonally opposite a pouring spout to facilitate the manual tilting of the handle to pour oil out of the container through the pouring spout. The pouring spout is normally closed with a removable cap. A removable plug is used to close the hole in the top wall.

22 Claims, 2 Drawing Sheets

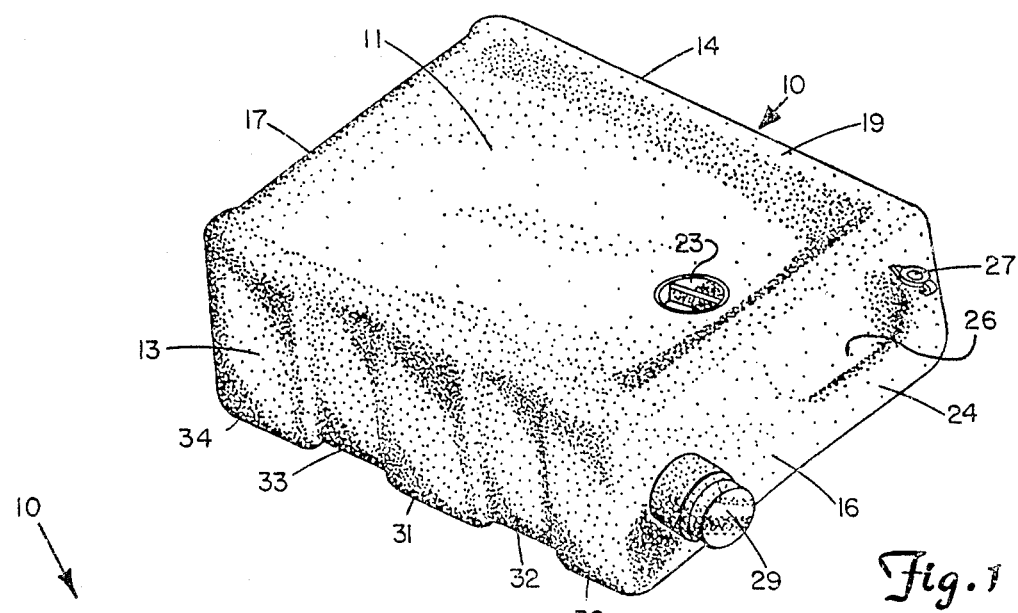
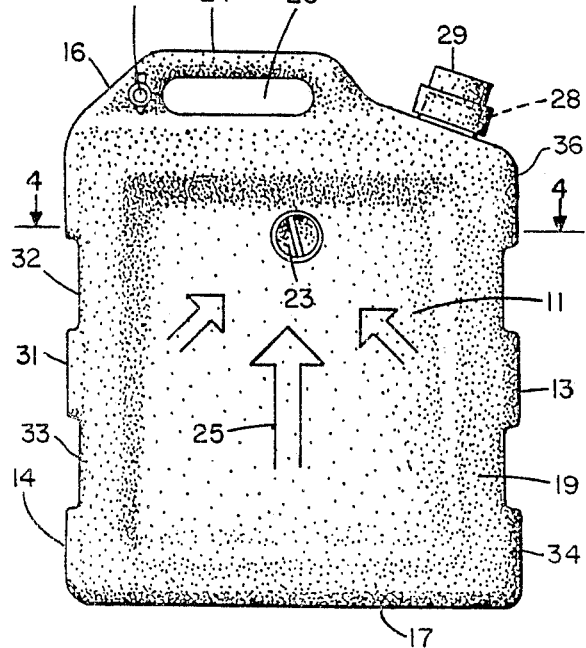
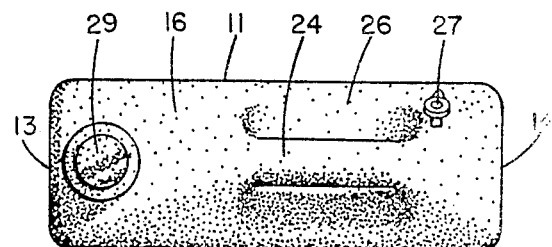
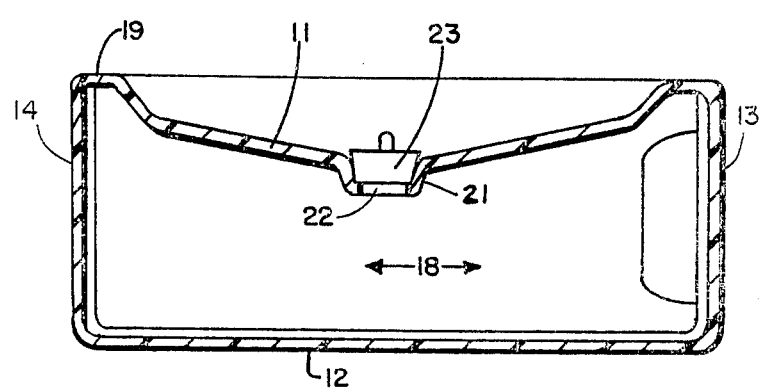

FLUID COLLECTION CONTAINER

FIELD OF INVENTION

The invention relates to containers for collecting and storing used motor oil so that the oil can be recycled or utilized in an environmentally compatible manner. The containers are drain pans used to collect motor oil, antifreeze, radiator coolant and other fluids that are drained from the engine of a motor vehicle.

BACKGROUND OF INVENTION

It is common practice to use drain pans and open top basins for collecting oil being drained from internal combustion engines of motor vehicles. At least half of the car owners in the United States change the lubricating oil in their vehicles themselves at least once a year. A small percentage, no more than 15 percent, of the drain oil is recovered for reuse as lubricant or fuel. Most of the oil is disposed of into the environment as a pollutant. For example, for many years used motor oil was spread on dirt and graveled driveways and roads to reduce airborne dust and dirt. Environmental concerns have resulted in legislation that requires the used motor oil to be collected at disposal stations for appropriate use with minimum harm to the environment.

Oil collection and storage containers for oil that is drained from a motor vehicle are known. These containers have a single handle on the top wall thereof to facilitate the carrying of the container. An example of this type of container is shown in U.S. Pat. No. RE 27,449. The single handle on the top of the container is not readily usable to pour the oil out of the pouring spout of the container. The user must grab the lower end of the container and tilt the container upwardly so that oil can run out of the pouring spout. This procedure is awkward and prone to slippage as there is no positive grip of the hands on the lower portion of the container. The container of the invention has overcome these disadvantages of prior drain pans for collecting drain oil from motor vehicles.

SUMMARY OF INVENTION

The invention is an apparatus for collecting and storing liquid drained from a machine, such as a motor vehicle, to facilitate the collection of the liquids and their proper disposal with a minimum harm to the environment. The apparatus is a container having an internal chamber for accommodating the liquid that is drained from the vehicle. The internal chamber is surrounded by first and second side walls, a bottom wall, and first and second end walls that are joined to a top wall. The bottom wall supports the container in a prone position, so that it can be moved under the vehicle in an appropriate position to receive the liquid that is drained from the vehicle The first end wall is normally disposed relative to the bottom wall so that the container can be supported in an upright position with the liquid stored in the chamber. A handle on the second end wall was used to transport the container in its upright position The top wall has an inwardly directed funnel-shaped section with a lower most portion thereof having an opening in communication with the chamber so that when liquid is drained onto the funnel-shaped section, it flows through the opening into the chamber. A second wall has a pouring spout with as second opening that is normally closed with removable cap. A second handle is secured to the container adjacent the second side wall in a corner that is diagonally opposite the pouring spout. The first and second handles are adapted to be hand-gripped to facilitate the pouring of the liquid from the chamber through the spout at an appropriate liquid disposal station.

The preferred embodiment of the container has first and second side walls joined to a bottom wall for supporting the container in a prone position to collect liquid that is being drained from a motor vehicle. The side walls and bottom walls have a plurality of transverse ribs that are separated with transverse grooves to provide a durable and strong wall structure. The first or lower end wall is normally disposed relative to the bottom wall so that the container can be supported in an upright position to store the liquid in the chamber. The opposite end of the container has a second end wall that is joined to the side walls and top and bottom walls to completely enclose the chamber. The top wall has an upright outer peripheral ridge that surrounds a generally rectangular, funnel-shaped pan. The ridge forms side walls for the pan to prevent overflow of liquid and reduce the splashing of the liquid out of the funnel-shaped pan of the container. The funnel-shaped pan of the container has in inwardly and downwardly sloping wall with a lower most portion thereof located in close proximity with respect to the second end wall. This allows the container to be positioned in its upright position with the level of the liquid in the chamber below the opening in the lower most portion of the pan. The second or upper wall of the container has the pouring spout which has the opening that is normally closed with a removable cap. A first handle is located in a transverse position adjacent to the second end wall and is secured thereto to facilitate the carrying of the container in its upright position. A second handle is secured to the top and bottom walls of the container adjacent the second side wall or the side wall that is opposite the side wall that is adjacent the pouring spout. Thus, the second handle is diagonally disposed across the container relative to the pouring spout. The first handle is normally disposed relative to the second handle, so that the second handle can be conveniently gripped with a hand of a person while the other hand of the person holds the upper end of the container to positively manipulate the container to facilitate the pouring of the liquid from the chamber out through the spout at an appropriate liquid disposal station.

DESCRIPTION OF DRAWING

FIG. 1 is a perspective view of the fluid collection container of the invention;

FIG. 2 is a top plan view of FIG. 1;

FIG. 3 is a plan view of the upper end of the fluid collection container;

FIG. 4 is an enlarged sectional view taken along the line 4—4 of FIG. 2;

DESCRIPTION OF PREFERRED EMBODIMENT

Figure 5:
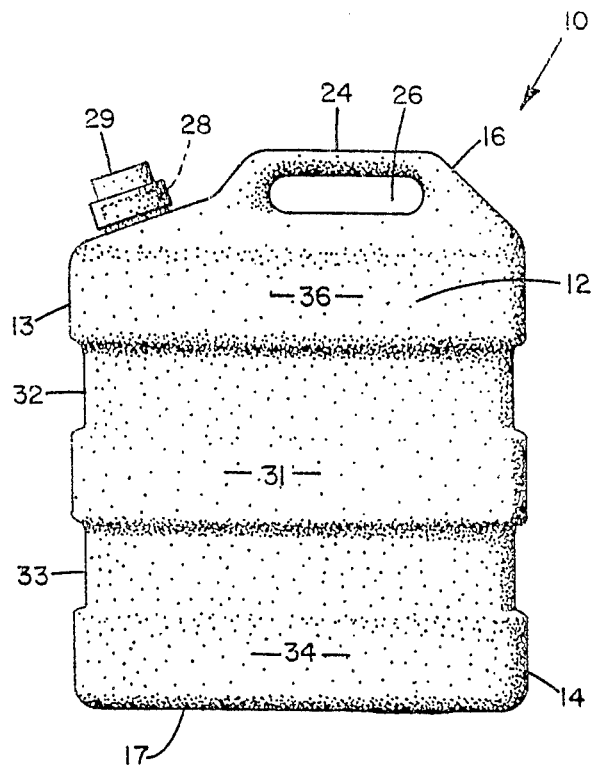
FIG. 5 is a bottom plan view of the fluid collection container.

Referring to FIGS. 1 to 3, there is shown the fluid collection container of the invention indicated generally at 10 for collecting motor vehicle fluids as they are drained from a motor vehicle such as an automobile, truck, tractor, motorcycles, and the like. The fluids are motor oil, antifreeze, radiator coolants, transmission oil and like fluids that are normally drained from an internal combustion engine, radiator, transmission and the like and replaced with new fluids. Container 10 is also usable to collect liquids flowing from machines, tanks, and other means having liquids that are drained therefrom.

A substantial number of motor vehicle owners in the United States change their lubricating oil themselves by draining the oil from the crankcases and disposing of the oil. Only a small fraction of this oil is recovered for reuse as a lubricant. Most of it is disposed in ways that ultimately bring it into the environment as a pollutant. It is estimated that over 500 million gallons of used lubricating oil are annually injected directly into the environment via landfills and other disposal methods. Container 10 of the invention provides a large-capacity container for collecting drain oil and transporting it to an appropriate disposal location. Container 10 can be manually carried and poured, as it has top and bottom handles usable to manually manipulate the container in a convenient manner to locate the container under a crankcase of a motor vehicle and subsequently pour the drain oil from the container into a disposal location, such as a tank or drum at a waste oil collection site.

Container 10 is a low-profile, generally rectangular structure having a top wall 11 located over a bottom wall 12. Side walls 13 and 14 and upper end wall 16 and lower end wall 17 are joined to the top and bottom walls 11 and 12 to enclose a chamber 18 that stores the oil within the container. Chamber 18 has a liquid capacity of 12 or more quarts. Container 10 can have a larger or smaller liquid-storing capacity Container 10 is molded of heavy-gauge polyethylene and like materials that are chemically inert to oils, antifreeze and other vehicle fluids. The material of container 10 is strong and durable and does not deteriorate under normal temperature conditions.

Referring to FIGS. 1, 2 and 4, container 10, when in a prone position, has a generally rectangular, upwardly directed ridge 19 extended around the entire outer peripheral edge of top wall 11. Ridge 19 has a generally convex shape and surrounds a funnel-shaped wall portion that slopes downwardly and inwardly from the lower end wall 17 toward the upper end wall 16. The top wall portion slopes downwardly and inwardly toward a downwardly projected sleeve 21 having an opening 22 into chamber 18. Opening 22 is located in close or contiguous relationship relative to upper end wall 16 so that when the container is placed in an upright position, opening 22 is in the upper portion of the container, thereby preventing the oil from flowing out of the container through opening 22. A generally cone-shaped plug 23 having a friction fit within sleeve 21 is used to close opening 22. Other types of caps or plugs can be used to close opening 22. When plug 23 is removed and the container is on its prone position, the oil that is directed onto top wall 11 will flow toward the opening 22 as indicated by arrows 25 in FIG. 2. The upwardly directed ridge 19 surrounding the sloping top wall section provides top wall 11 with a large funnel-shaped pan which, in addition to directing oil flow to opening 22, prevents overflow of oil and reduces splashing of oil outwardly of container 10.

The upper end wall 16 has a first handle 24 extended over an elongated opening 26 to accommodate the hand of a person. Handle 24 is parallel to the width of the container. As shown in FIG. 3, handle 24 is located in the middle horizontal plane of container 10 and aligned with a pouring spout 28 closed with a cap 29. An air-bleed device 27 is mounted on the upper end wall 16 to allow air to flow from the chamber 18 when oil is being drained into chamber 18. This prevents the bubbling and gurgling of the oil as it flows through opening 22 into chamber 18. Air-bleed device 27 has a snap cover that fits over a short, circular rib or annular button surrounding a hole into the chamber 18. The cover snaps on to the rib to close the hole therein. The cover is manually releasable from the rib to open the hole whereby air can flow from chamber 18. Other types of air-bleed structures can be used with the container, such as a push-pull open and closed valve.

Upper end wall 16 has a upwardly directed cylindrical pouring spout 28 located adjacent the right end of handle 24 and side wall 13 as shown in FIG. 2. A cup-shaped cap 29 is threaded onto spout 28 to close the opening of spout 28. Cap 29 is removed from spout 28 to allow the oil in chamber 18 to be poured into a desired location, such as an appropriate oil disposal collection center.

Figure 7:
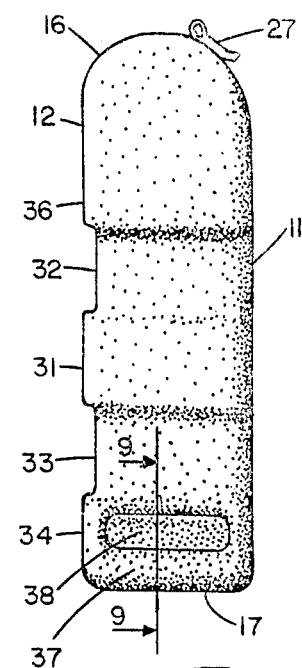
FIG. 7 is a side view of the right side of FIG. 5.
Figure 6:
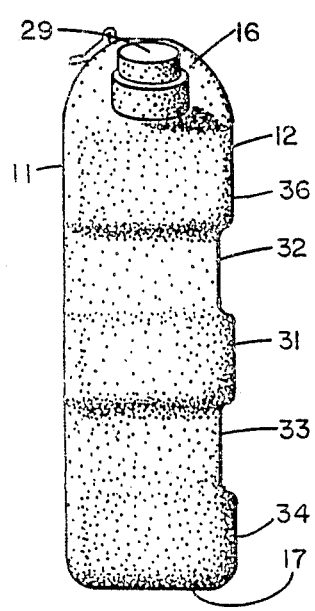
FIG. 6 is side view of the left side view of FIG. 5.

As shown in FIGS. 5, 6, and 7, the mid-section of container 10 has a generally flat, transverse rib or band 31. Band 31 extends upwardly inside side walls 13 and 14. Generally flat transverse grooves 32 and 33 are located on opposite sides of band 31. Grooves 32 and 33 separate the band 31 from generally flat bands or ribs 34 and 36. Rib 34 extends to bottom wall 17 and has ends that extend upwardly into side walls 13 and 14. Rib 36 joins with the end wall 16 and has opposite ends that extend upwardly into side walls 13 and 14. The ribs 31, 34, and 36 strengthen and stabilize the bottom wall 12 and side walls 13 and 14, minimize bulging and outward movement of the walls which may be caused by liquids and gases located within chamber 18 of container 10.

Figure 8:
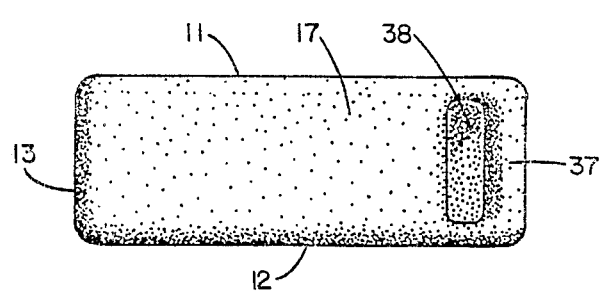
FIG. 8 is a plan view of the lower end of the fluid collection container.
Figure 9:
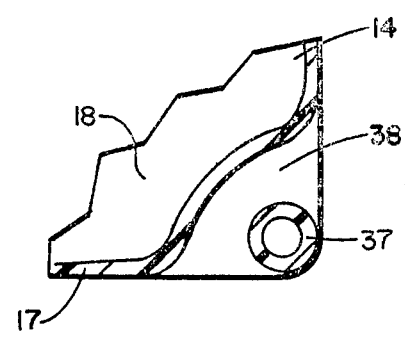
FIG. 9 is an enlarged sectional view taken along the line 9—9 of FIG. 7.

Referring to FIGS. 7, 8, and 9, the lower portion of container 10 adjacent the side wall 12 and the bottom wall 17 has a second elongated, generally cylindrical handle 37. Handle 37 is joined to the lower corners of the top and bottom walls 12 and 11, respectively. The middle portion or span of handle 37 is spaced from side wall 14 as shown in FIG. 9 to provide an opening or recess 38 for accommodating the hand of a user. Handle 37 is located diagonally opposite spout 28 and extends normal to the transverse longitudinal extent of first handle 24. The middle longitudinal plane of container 10 that passes through handle 24 bisects handle 37.

Container 10 is used in the prone position, as shown in FIG. 1 to drain oil from internal combustion engine. Plug 23 is removed from sleeve 21, thereby opening hole 22. The air bleed device 27 is opened so that the air can flow out of chamber 18 when the oil flows into chamber 18 through hole 22. Container 10 is placed under the engine with bottom wall 12 in engagement with a support surface, such as a floor. Top wall 11 is placed under the engine drain plug which is removed from the oil pan, thereby allowing oil to flow onto top wall 11. The oil flows as indicated by the arrows 25 toward the hole 22 which directs the oil into chamber 18. After the oil has been drained from the engine, container 10 is pulled from under the engine by using handle 24. The plug 23 is placed back in the sleeve 21, thereby closing hole 22. The air bleed device 27 is snapped shut. Container 10 is set up in an upright position by use of handle 24. Handle 24 is also used to transport the container to a oil disposal location.

The oil is poured from container 10 by removing the cap 29 thereby opening the hole in spout 28. The user uses his/her hands in engagement with the first handle 24 and the second handle 37 to lift and tilt container 10 so that spout 28 is located above its oil receptacle. Container 10 can be conveniently held by the user until all of the oil is drained from chamber 18. The user has a positive grip with his/her hands on both the handles 24 and 37 which precludes the slippage of the container from the user as well as inadvertent diversion of the oil as it is being poured from the container.

While there has been shown a described preferred embodiment of the fluid collection container and its use of the invention, it is understood that changes in the materials, structures, and arrangement of structures may be made by those skilled in the art without departing from the invention. For example, the container preferably made of a durable plastic can be made of metal The invention of the fluid collection container is defined in the following claims.

I claim:

1. An apparatus for collecting liquid draining from a motor vehicle and storing the same comprising: a container having an internal chamber for storing liquid, first and second side walls, a bottom wall for supporting the container in a prone position to collect liquid draining from a motor vehicle, said side walls and bottom wall having a plurality of transverse ribs separated by the transverse grooves, a first end wall normally disposed relative to the bottom wall for supporting the container in an upright position to store liquid in said chamber, a second end wall opposite the first end wall, and a top wall joined to the side walls and end walls, said walls surrounding said chamber, said top wall having an upright continuous outer peripheral ridge and a funnel-shaped portion surrounded by said ridge, said funnel-shaped portion having an inwardly and downwardly sloping wall with a lower most portion thereof located in close relationship with respect to the second end wall, said lower most portion having an opening in communication with said chamber whereby liquid drained onto the funnel-shaped portion flows through said opening into the chamber, a spout secured to the second end wall, said spout having a second opening open to the chamber, said spout being located adjacent said first side wall, removable cap means mounted on the spout for closing the second opening, a first handle secured to said second end wall whereby the container can be transported in the upright position, and a second handle secured to the top and bottom walls adjacent the bottom of the second side wall and first end wall, said second handle being spaced from the second side wall and the first end wall to provide a recess in said second side wall and first end wall under the second handle, said recess being open adjacent to the second side wall and open adjacent to the first end wall to accommodate a person's hand for firmly gripping said second handle, said first and second handles adapted to be gripped by both hands of a person to facilitate pouring of liquid from the chamber out through the spout.

2. The apparatus of claim 1 wherein: the first handle is normally disposed relative to said second handle.

3. The apparatus of claim 1 wherein: the second handle is located in a corner of the container diagonally opposite said spout.

4. The apparatus of claim 1 wherein: the first handle has a mid-section spaced from the second end wall to provide an opening to accommodate one hand of a person, said first handle being normally disposed relative to the second handle, said second handle being located in a corner of the container diagonally opposite said spout.

5. The apparatus of claim 4 wherein: the first handle is located in the middle horizontal plane of the container when it is in the prone position, said plane bisecting said second handle.

6. The apparatus of claim 1 wherein: said transverse ribs in said side walls and bottom wall includes a middle rib located generally in the central portion of the container.

7. The apparatus of claim 1 including: air bleed means mounted on said second end wall operable to allow air to flow out of said chamber when liquid is drained into said chamber.

8. An apparatus for collecting liquid draining from a machine and storing the same comprising: a container having an internal chamber for storing liquid, first and second side walls, a bottom wall for supporting the container in a prone position to collect liquid draining from a machine, a first end wall normally disposed relative to the bottom wall for supporting the container in an upright position to store liquid in said chamber, a second end wall opposite the first end wall, and a top wall joined to said side walls and end walls, said walls surrounding said chamber, said top wall having an inwardly directed funnel-shaped portion with a lower most portion thereof having an opening in communication with said chamber whereby liquid drained onto the funnel-shaped portion flows through said opening into the chamber, a spout secured to the second end wall, said spout having a second opening open to the chamber, removable cap means mounted on the spout for closing the second opening, a first handle secured to said second end wall whereby the container can be transported in the upright position, and a second handle secured to the container adjacent the first end wall and the second side wall, said second handle being spaced from the second side wall and the first end wall to provide a recess in said second wall and first end wall under the second handle, said recess being open adjacent to the second side wall and open adjacent to the first end wall to accommodate a person's hand for firmly gripping said second handle, said first and second handles adapted to be gripped by both hands of a person to facilitate pouring of liquid from the chamber out through the spout.

9. The apparatus of claim 8 wherein: said bottom wall has a plurality of transverse ribs separated by transverse grooves.

10. The apparatus of claim 9 wherein: said transverse ribs in said bottom wall includes a middle rib located generally in the central portion of the container.

11. The apparatus of claim 9 wherein: said side walls have a plurality of transverse ribs separated by transverse grooves coextensive with the transverse ribs and transverse grooves in said bottom wall.

12. The apparatus of claim 8 wherein: said top wall includes an upwardly directed continuous outer peripheral ridge surrounding said funnel-shaped section.

13. The apparatus of claim 12 wherein: said lower most portion of the funnel-shaped section of the top wall is located in contiguous relationship with respect to the second end wall.

14. The apparatus of claim 8 wherein: the first handle is normally disposed relative to said second handle.

15. The apparatus of claim 8 wherein: the first handle has a mid-section spaced from the second end wall to provide an opening to accommodate one hand of a person, said first handle being normally disposed relative to the second handle.

16. The apparatus of claim 15 wherein: the first handle is located in the horizontal plane of the container when it is in the prone position, said plane bisecting said second handle.

17. The apparatus of claim 8 including: air bleed means mounted on said second end wall operable to allow air to flow out of said chamber when liquid is drained into said chamber.

18. The apparatus of claim 8 wherein: said second handle has a generally cylindrical shape.

19. The apparatus of claim 8 wherein: said top and bottom walls have portions closing the ends of said recess.

20. An apparatus for collecting liquid draining from a machine and storing the same comprising: a container having an internal chamber for storing liquid, first and second side walls, said side walls being generally parallel and laterally spaced from each other, a bottom wall for supporting the container in a prone position to collect liquid draining from a machine, said side walls and bottom wall having a plurality of transverse ribs separated by transverse grooves, a first generally flat end wall normally disposed relative to the bottom wall for supporting the container in an upright position to store liquid in said chamber, a second end wall opposite the first end wall, and a top wall joined to the side walls and end walls, said walls surrounding said chamber, said top wall having an upright continuous outer peripheral ridge and a funnel-shaped portion surrounded by said ridge, said funnel-shaped portion having an inwardly and downwardly sloping wall with a lower most portion thereof located in close relationship with respect to the second end wall, said lower most portion having a first opening in communication with said chamber whereby liquid drained onto the funnel-shaped portion flows through said opening into the chamber, a first cap for closing said first opening, a tubular spout secured to the second wall, said spout having a second opening open to the chamber whereby liquid can be poured from the container, said spout extended away from the second wall and located adjacent an end of the first side wall, removable second cap mounted on the spout for closing the second opening, a first handle secured to said second end wall whereby the container can be transported in its upright position, said first handle being located in the middle horizontal plane of the container when it is in the prone position, said first handle having a mid-section spaced from the second end wall to provide an opening to accommodate one hand of a person whereby the one hand can firmly grip said first handle, and a second handle secured to the top and bottom walls adjacent the bottom of second side wall and the first end wall generally diagonally opposite said spout, said second handle being normally disposed relative to the first handle, said second handle being spaced from the second side wall and the first end wall to provide a recess in said second side wall and first end wall under the second handle, said recess being open adjacent to the second side wall and open adjacent to the first end wall to accommodate a person's other hand for firmly gripping said second handle, said first and second handles adapted to be gripped by both hands of a person to facilitate pouring of liquid from the chamber out through the spout.

21. The apparatus of claim 20 wherein: said second handle has a generally cylindrical shape.

22. The apparatus of claim 20 wherein: said top and bottom walls have portions closing the ends of said recess.

* * * * *